(12) United States Patent
Levin et al.

(10) Patent No.: US 8,882,048 B2
(45) Date of Patent: Nov. 11, 2014

(54) IN-SPACE PROCESSING AND DELIVERY SYSTEM

(76) Inventors: Eugene M. Levin, Minnetonka, MN (US); Joseph A. Carroll, Chula Vista, CA (US); Jerome Pearson, Mount Pleasant, SC (US)

( * ) Notice: Subject to any disclaimer, the term of this patent is extended or adjusted under 35 U.S.C. 154(b) by 279 days.

(21) Appl. No.: 13/113,001

(22) Filed: May 20, 2011

(65) Prior Publication Data

US 2012/0292449 A1 Nov. 22, 2012

(51) Int. Cl.
| | | |
|---|---|---|
| *B64G 1/64* | (2006.01) | |
| *B64G 1/00* | (2006.01) | |
| *B64G 1/56* | (2006.01) | |
| *B64G 1/40* | (2006.01) | |
| *B64G 1/54* | (2006.01) | |

(52) U.S. Cl.
CPC .. *B64G 1/00* (2013.01); *B64G 1/56* (2013.01); *B64G 1/64* (2013.01); *B64G 1/40* (2013.01); *B64G 1/54* (2013.01)
USPC ............ 244/172.5; 244/158.2; 244/172.4

(58) Field of Classification Search
USPC .......... 244/158.1, 158.2, 159.4, 172.4, 172.5, 244/173.3
See application file for complete search history.

(56) References Cited

U.S. PATENT DOCUMENTS

| | | | |
|---|---|---|---|
| 3,534,926 A | 10/1970 | Wuenscher | |
| 3,647,924 A | 3/1972 | Rasquin | |
| 4,936,528 A | 6/1990 | Butner et al. | |
| 4,991,799 A | 2/1991 | Petro | |
| 5,082,211 A | 1/1992 | Werka | |
| 5,153,407 A | 10/1992 | Schall | |
| 5,405,108 A | 4/1995 | Marin, Jr. et al. | |
| 5,421,540 A | 6/1995 | Ting | |
| 5,803,407 A * | 9/1998 | Scott .......................... | 244/172.4 |
| 5,813,632 A | 9/1998 | Taylor | |
| 6,206,328 B1 * | 3/2001 | Taylor ........................ | 244/159.6 |
| 6,523,784 B2 | 2/2003 | Steinsiek et al. | |
| 6,655,637 B1 | 12/2003 | Robinson | |
| 6,755,377 B1 | 6/2004 | Levin et al. | |
| 6,758,443 B1 | 7/2004 | Levin et al. | |
| 6,830,222 B1 | 12/2004 | Nock et al. | |
| 6,942,186 B1 | 9/2005 | Levin et al. | |

(Continued)

OTHER PUBLICATIONS

"Report on the Utilization of the External Tanks of the Space Transportation System," NASA-CR-195281, NASA Report from a Workshop held at the University of California, San Diego, Ref. No. CS182-3, pp. 172, (Aug. 23-27, 1982).

(Continued)

*Primary Examiner* — Timothy D Collins
*Assistant Examiner* — Jamie S Stehle
(74) *Attorney, Agent, or Firm* — Dicke, Billig & Czaja, PLLC

(57) ABSTRACT

A processing and delivery system is in space around a celestial body having a magnetic field. The system includes at least one facility having supplies and configured for in-space recycling and manufacturing to produce processed objects utilizing space debris objects and the supplies. The system includes at least one space vehicle configured to deliver the space debris objects from their orbits to the at least one facility using electrodynamic propulsion. The system includes at least one space vehicle configured to deliver new supplies to the at least one facility from other orbits using electrodynamic propulsion. The system includes at least one space vehicle configured to deliver the processed objects from the at least one facility to their destination orbits using electrodynamic propulsion.

55 Claims, 12 Drawing Sheets

(56) References Cited

U.S. PATENT DOCUMENTS

| | | | |
|---|---|---|---|
| 7,163,179 B1 | 1/2007 | Taylor | |
| 7,503,526 B1 * | 3/2009 | Taylor et al. | 244/158.2 |
| 7,513,459 B2 | 4/2009 | Cepollina et al. | |
| 7,807,097 B1 | 10/2010 | Tucker | |
| 7,913,954 B2 | 3/2011 | Levin | |
| 7,971,831 B2 | 7/2011 | Roseman | |
| 7,988,096 B2 | 8/2011 | Humphries | |
| 8,052,092 B2 | 11/2011 | Atmur et al. | |
| 8,262,029 B2 | 9/2012 | Levin | |
| 2003/0029969 A1 | 2/2003 | Turner | |
| 2004/0031885 A1 * | 2/2004 | D'Ausilio et al. | 244/172 |

OTHER PUBLICATIONS

Brin, D., "Tank Farm Dynamo," Analog Science Fiction and Fact, David Brin's Official Web Site, pp. 1-9, (Nov. 1983). <Retrieved: http://www.davidbrin.com/tankfarm.htm>.

Carroll, J.A., "Potential on Orbit Uses of Aluminum from the External Tank," AIAA/GNOS Minisymposium paper, GNOS-83-006, pp. 1-15, (Sep. 1983).

Chern, T.S., Utilization of Space Shuttle External Tank Materials by Melting and Powder Metallurgy, Academy Transactions Note, Acta Astronautica, vol. 12, No. 9, pp. 693-698, (Sep. 1985).

Canough, G.E. et al., "What Goes Around, Comes Around: What to Do About Space Debris?" Analog Science Fiction/Science Fact, pp. 54-67 (Mar. 1991).

Eichler, P. et al., "Strategy for the Economical Removal of Numerous Larger Debris Objects from Earth Orbits," Acta Astronautica, vol. 29, No. 1, pp. 29-36, (Jan. 1993).

Spenny, C. et al., "An Aluminum Salvage Station for External Tanks of the Space Shuttle," Acta Astronautica, vol. 29, No. 5, pp. 379-397, (May 1993).

Carroll, J. A., "Space Transport Development Using Orbital Debris," Final Report on NIAC Phase I, Research Grant No. 07600-087, pp. 1-43, (Dec. 2, 2002).

Pearson, J. et al., "Overview of the ElectroDynamic Delivery Express (EDDE)," 39th AIAA/ASME/SAE/ASEE Joint Propulsion Conference and Exhibit, pp. 1-14 (Jul. 20-23, 2003).

"Recycling Space Junk," pp. 2, (Web Page posted in 2006), Retrieved: <http://www.islandone.org/LEOBiblio/SPBI1RE.HTM>.

Ricciardi, M., "The Space Junk Remediation Project," pp. 1-6, (Web Page posted in 2008), Retrieved: <http://www.chaosmosis.net/Space Junk_MR-designs.htm>.

Dunstan, J.E. et al., "Legal and Economic Implications of Orbital Debris Removal: A Free Market Approach," NASA-DARPA International Conference on Orbital Debris Removal, pp. 7, (Dec. 8-10, 2009).

Klinkrad, H. et al., "Space Debris Environment Remediation," NASA-DARPA International Conference on Orbital Debris Removal, pp. 10, (Dec. 8-10, 2009).

Pearson, J. et al., "EDDE: ElectroDynamic Debris Eliminator for Active Debris Removal," NASA-DARPA International Conference on Orbital Debris Removal, pp. 7 (Dec. 8-10, 2009).

Koshkin, Alexander, In Russia are Developing Space Garbage, ANO Revision Daily Newspaper, GZT.RU, pp. 2 (Web Page posted in 2009). Retrieved: <http://www.gzt.ru/topnews/economics/-v-rossii-razrabatyvayut-kosmicheskii-musorovoz-/271066.html>.

Pearson, J. et al., "EDDE: ElectroDynamic Debris Eliminator for Safe Space Operations," 13th Annual FAA/AIAA Commercial Space Transportation Conference, pp. 7 (Feb. 10-11, 2010).

Pearson, J., "The ElectroDynamic Debris Eliminator (EDDE): Removing Debris in Space," The Bent of Tau Beta Pi, vol. CI, No. 2, pp. 17-21, (Spring 2010).

Pearson, J. et al., "EDDE: ElectroDynamic Debris Eliminator: New Frontiers in Space Traffic Management," Fourth IAASS Conference, pp. 9, (May 19-21, 2010).

Pearson, J. et al., "EDDE, ElectroDynamic Debris Eliminator: New Frontiers in Space Traffic Management," pp. 8, (2010).

Pearson, J. et al., "EDDE: ElectroDynamic Debris Eliminator: Selective Removal and Recycling in LEO," Space Studies Institute, Space Manufacturing #14, pp. 9, (Oct. 29-31, 2010).

David, Leonard, "Ugly Truth of Space Junk: No Feasible Solutions," Space.com, Technology & Science, pp. 1-3 (Updated May 10, 2011). Retrieved: <http://www.msnbc.msn.com/id/42975224/ns/technology_and_science-space/>.

Cowing, Keith, "Congress is Using Bad Numbers to Trash a Business Case," NASA Watch, pp. 1 (May 26, 2011). Retrieved: <http://nasawatch.com/archives/2011/05/using-bad-numbe.html.>.

* cited by examiner

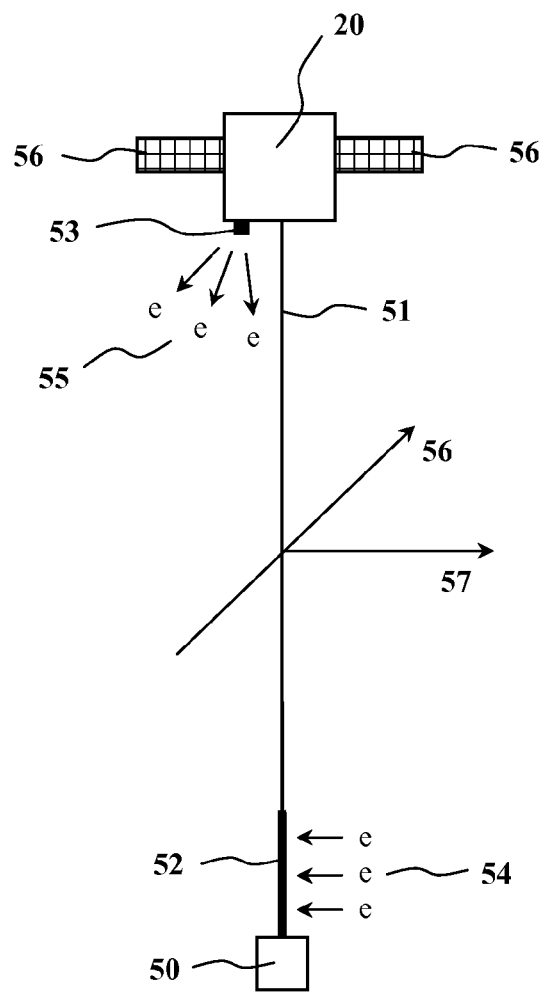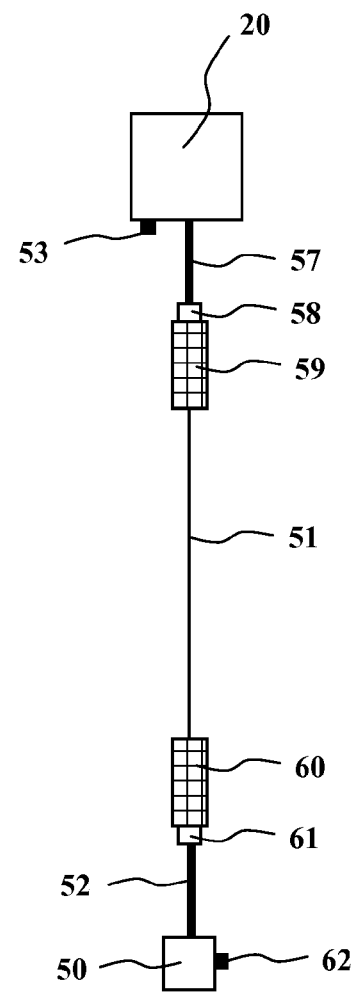
FIG. 3A                    FIG. 3B

IN-SPACE PROCESSING AND DELIVERY SYSTEM

BACKGROUND

Space debris from discarded upper stages, satellites not in use, and assorted pieces from staging, tank explosions, and impacts has been growing for the past 50 years. There are currently about 9,000 tracked debris objects in low Earth orbits per 450 operational satellites (i.e., 20 to 1 ratio). The number of untracked fragments in the centimeter range which can be lethal to operational satellites is simply staggering, on the order of 500,000.

It is understood now that after years of debris accumulation, the debris cloud in low Earth orbits has crossed critical density thresholds over a wide range of altitudes, and entered into the phase of accelerated debris creation in collisions that gradually become more and more frequent. In this deteriorating environment, catastrophic collisions are becoming a reality. On Feb. 10, 2009, derelict Cosmos 2251 collided with operational Iridium 33 at 11.6 km/s. In less than a millisecond, the two satellites disintegrated, producing nearly 2,000 tracked debris object fragments and on the order of 100,000 untracked debris object fragments in the centimeter range. Theory predicts that we may witness another catastrophic collision in this decade. With each collision, the produced debris dramatically increase the risk to active satellites and the need for avoidance maneuvering.

It is also understood that large debris objects, such as old upper stages, should be removed first, because they are typically the primary source of many thousands of small fragments generated in collisions between large objects. These small fragments are like bullets, whizzing all around at orbital speeds and capable of disabling operational satellites upon impact. They are too small to track and avoid, but too heavy to shield against. Unless the source of new fragments is removed, the near-Earth orbits may be rendered unusable.

The task of removing large space debris is enormous. There are over 2,000 large debris objects totaling 2,000 tons scattered throughout low Earth orbits. Many, or preferably, substantially all of these objects should be removed to substantially reduce the risk of debris generation in collisions. So far, debris cleanup has not been attempted, because no practical solutions have been developed. It has been estimated that sending rockets to remove large debris would be very expensive: the cost per kilogram of debris removed would exceed a typical launch cost per kilogram. This cost is prohibitive.

Another serious problem is the method of disposal of debris. One way would be to bring the debris objects to low orbits and let them reenter the atmosphere and burn in the atmosphere. However, large objects do not burn completely, and there are serious concerns about liability of atmospheric reentry of many large objects.

Another concern is the wasted value of these objects. It was very expensive to launch them to orbit. It would be advantageous to make some use of it, and there is a need. On the one hand, we have thousands of tons of "scrap material" circling the Earth, but on the other hand, we need to launch thousands of tons of parts and equipment to build space hotels and habitats, fuel depots, and space manufacturing and servicing facilities.

In 2010, NASA formulated new Grand Challenges in Space Technology. One of them is the Challenge of Space Debris Hazard Mitigation. It is acknowledged that "mitigation is difficult and requires solutions that are practical, yet technically and economically feasible." But, there is also the Challenge of Space Way Station, which seeks to "develop pre-stationed and in-situ resource capabilities, along with in-space manufacturing, storage and repair to replenish the resources for sustaining life and mobility in space." It is acknowledged that the "current capabilities are insufficient to extract, refine, form stock, and transport in-situ materials for in-space manufacturing, servicing, fueling and repair. In-space system repair and maintenance is cost-prohibitive and difficult, consequently, many spacecraft are de-orbited at end-of life."

SUMMARY

One embodiment provides a processing and delivery system in space around a celestial body having a magnetic field. The system includes at least one facility having supplies and configured for in-space recycling and manufacturing to produce processed objects utilizing space debris objects and the supplies. The system includes at least one space vehicle configured to deliver the space debris objects from their orbits to the at least one facility using electrodynamic propulsion. The system includes at least one space vehicle configured to deliver new supplies to the at least one facility from other orbits using electrodynamic propulsion. The system includes at least one space vehicle configured to deliver the processed objects from the at least one facility to their destination orbits using electrodynamic propulsion.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3A is a diagram illustrating one embodiment of an in-space recycling and manufacturing facility.

FIG. 3B is a diagram illustrating one embodiment of an in-space recycling and manufacturing facility.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various embodiments described herein may be combined with each other, unless specifically noted otherwise.

Embodiments relate to orbital debris removal, in-space transportation, in-space manufacturing, and on-orbit servicing. Embodiments provide a system of in-space processing facilities and delivery vehicles that uses orbital debris as a source of materials and parts for in-space manufacturing and uses space vehicles with electrodynamic propulsion to deliver debris objects, supplies, service modules, and products.

Embodiments can provide a practical and economical system that can turn space debris into a source of materials and parts for space manufacturing in low Earth orbit, addressing NASA Grand Challenges of Space Debris Hazard Mitigation and Space Way Station.

Figure 1:
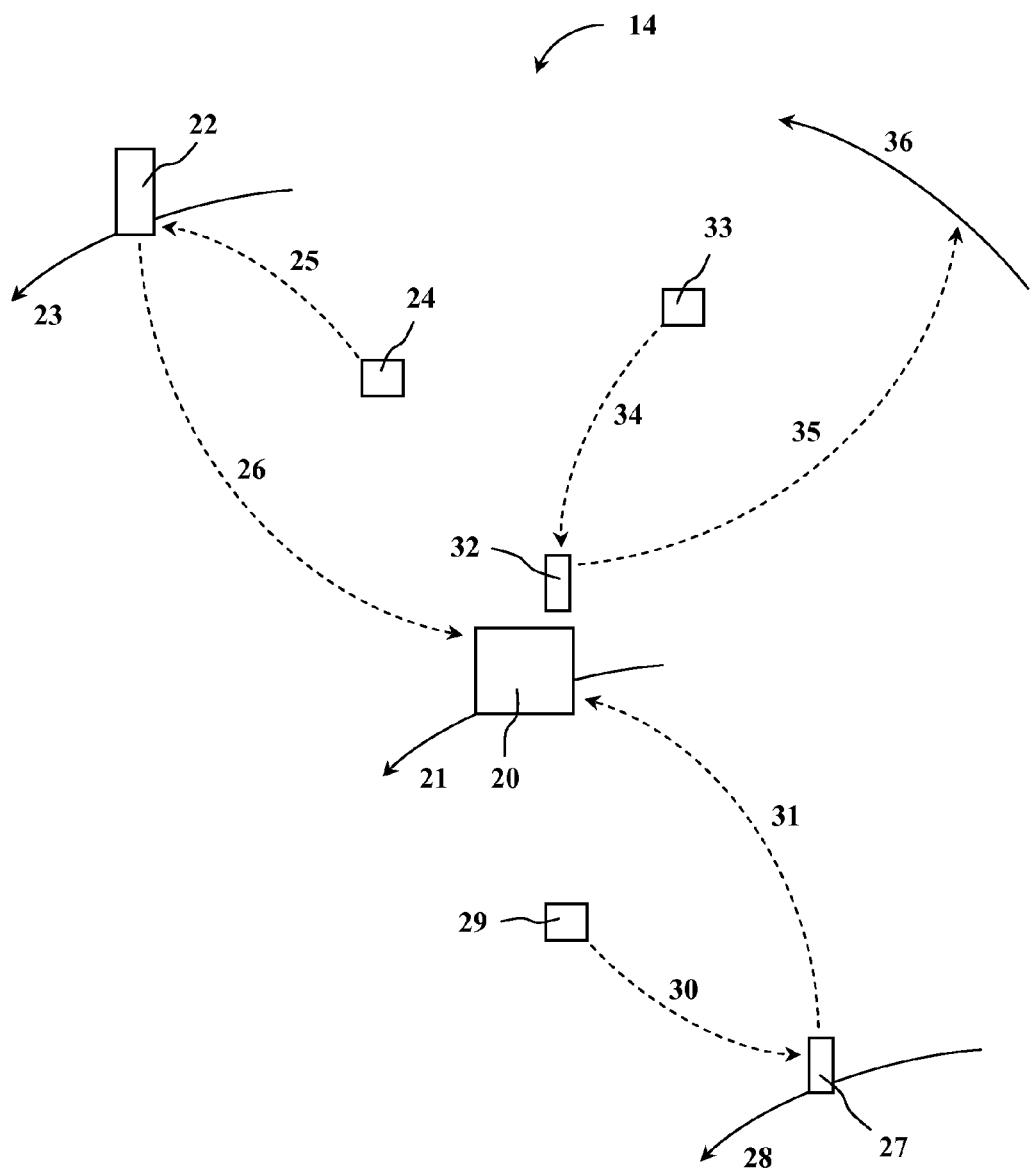
FIG. 1 is a diagram illustrating one embodiment of a space processing and delivery system.

FIG. 1 illustrates one embodiment of a space processing and delivery system 14. A facility 20 is in orbit 21 in space around a celestial body having a magnetic field. Facility 20 holds supplies and is configured to recycle space debris, recover materials and parts from the debris, and manufacture products utilizing these materials, parts, and supplies. Facility 20 is also configured to interface with space delivery vehicles.

Space debris object 22 is in orbit 23 around the same celestial body. Common debris objects are upper stages, satellites not in use, tracked debris object fragments, and untracked debris object fragments. Satellites not in use include non-functioning satellites, partially functioning satellites, and fully functioning satellites that are not being operated. Space vehicle 24 is configured to deliver space debris objects to processing facility 20 using electrodynamic propulsion. Space vehicle 24 approaches space debris object 22 along path 25, captures space debris object 22, and delivers it to facility 20 along path 26, where space debris object 22 is handed over to facility 20 for storage and processing.

Supply package 27 is made available for pick-up in orbit 28. In some embodiments, supply package 27 is delivered as a secondary payload from the ground and left in orbit allowable by the primary launch objective. In other embodiments, supply package 27 is produced by another orbital manufacturing facility and left in orbit allowable by the delivery system of that facility. In some embodiments, supply package 27 contains at least one of structural elements, parts of a control system, manufacturing tools, manufacturing materials, replacement parts, and new modules to be integrated with the processing facility. Space vehicle 29 is configured to deliver supply packages to processing facility 20 using electrodynamic propulsion. Space vehicle 29 approaches supply package 27 along path 30, captures supply package 27, and delivers it to facility 20 along path 31, where supply package 27 is handed over to facility 20 for storage and utilization.

Facility 20 recovers materials and parts from space debris. In one embodiment, some parts of space debris objects are cut into pieces. In one embodiment, these pieces are substantially rectangular of similar sizes. In one embodiment, some of these pieces are used for further processing. In one embodiment, some parts of space debris objects are processed into metal powder. In one embodiment, some of this metal powder is used for further processing. In one embodiment, some parts of space debris objects are melted. In one embodiment, some parts of the new objects are produced by vapor deposit. In one embodiment, some parts of the new objects are produced by molten spray. In one embodiment, some parts of the new objects are produced by 3D printing. In one embodiment, some parts of space debris objects are reconditioned for reuse.

Facility 20 uses supplies and materials and parts recovered from space debris to make new products. In one embodiment, products include construction elements. In one embodiment, products include shielding against radiation and impact of small objects. Space vehicle 33 is configured to deliver products from processing facility 20 to their destination orbits using electrodynamic propulsion. Space vehicle 33 approaches facility 20 along path 34, facility 20 releases product package 32 and hands it over to space vehicle 33. Space vehicle 33 acquires product package 32 and delivers it to its destination orbit 36 along path 35, where it is released for deployment or pick-up.

In one embodiment, delivery vehicle 33 is used to dispose of some parts of the debris objects that cannot be processed at facility 20. In one embodiment, the disposal method is to bring a package with these parts to a low orbit for atmospheric reentry.

In one embodiment, facility 20 is robotic. In one embodiment, facility 20 is remotely controlled. In one embodiment, facility 20 provides supplies to delivery vehicles 24, 29, and 33. In one embodiment, these supplies comprise replacement parts.

In one embodiment, facility 20 is placed in a debris cluster for more efficient debris collection. Multiple clusters of debris objects exist, both in terms of inclination and altitude.

In-space processing and delivery system embodiments described herein can be comprehensive. In-space processing and delivery embodiments can support substantially all operations employed for mining the debris field. In-space processing and delivery embodiments can turn debris from a liability into a valuable resource. In-space processing and delivery embodiments can provide access to substantially an entire debris field in low orbits, where the strength of the magnetic field and the density of the ambient plasma are sufficient for electrodynamic propulsion. Electrodynamic propulsion does not require fuel. Instead electrodynamic propulsion uses electricity, which can be obtained, for example, from solar power. Delivery vehicles using electrodynamic propulsion can repeatedly make large orbit changes and continue doing so for years, which is impossible with today's rockets. In-space processing and delivery embodiments can offer great flexibility. In embodiments, dedicated launches to the in-space processing and delivery facilities are not necessary. Embodiments of the electrodynamic propulsion delivery vehicles can pick supplies from and deliver products to any orbit in the operational altitude range.

In-space processing and delivery embodiments can open new markets in debris recycling and in-space manufacturing, making it economically viable on a large scale for the first time since the beginning of the space era.

In one embodiment, each delivery vehicle using electrodynamic propulsion can deliver up to about 36 tons of debris to the processing facility at a cost per kilogram of only few percent of the typical launch cost per kilogram. Access to thousands of tons of material with such low delivery costs will make products manufactured in space highly competitive with shipments from the ground.

Figure 2:
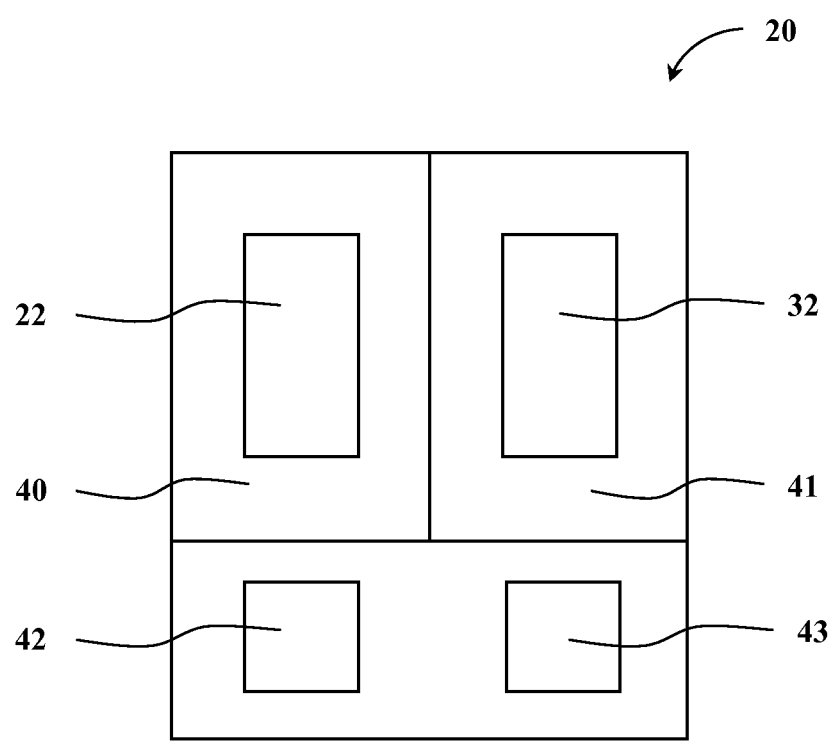
FIG. 2 is a diagram illustrating of one embodiment of an in-space recycling and manufacturing facility.

FIG. 2 illustrates one embodiment of in-space recycling and manufacturing facility 20. Facility 20 has enclosures for space debris objects and new products and storage for supplies and parts of processed debris objects. Space debris object 22 is placed in enclosure 40 for processing. In one embodiment, the processing comprises cutting the debris object into smaller pieces. One function of enclosure 40 is to contain particles that can be produced during the processing. Another function of enclosure 40 is to provide better lighting and thermal control. Another function of enclosure 40 is to provide vapor containment. In one embodiment, enclosure 40 is formed by an inflatable structure. In one embodiment, the atmosphere inside enclosure 40 contains some amount of oxygen to provide passive oxidation of the freshly cut metal. In one embodiment, the atmosphere inside enclosure 40 is purified using particle filters. In one embodiment, parts of processed debris objects are stored in storage 42.

New product 32 is manufactured in enclosure 41. One function of enclosure 41 is to contain particles that can be produced during the manufacturing. Another function of enclosure 41 is to provide better lighting and thermal control. Another function of enclosure 41 is to provide vapor containment. In one embodiment, enclosure 41 is formed by an inflatable structure. In one embodiment, supplies for debris processing and manufacturing are stored in storage 43.

FIG. 3A illustrates one embodiment of in-space recycling and manufacturing facility 20. Facility 20 uses electrodynamic propulsion to maintain and change its orbit. Facility 20 moves through the magnetic field of the celestial body surrounded by ambient plasma. Facility 20 is tethered to counterweight 50 using long insulated electric conductor 51 and bare metal tape 52 for electron collection. In one embodiment, electric conductor 51 is about 5 km long and electron collector 52 is about 1 km long.

Electron collector 52 is biased positively, attracting electrons 54 from the ambient plasma. Electrons 54 collected by electron collector 52 flow through electric conductor 51 to facility 20, where electrons 55 are ejected back to the ambient plasma by hollow cathode 53. The loop of electric current is closed through the ambient plasma. The resulting electric current in conductor 51 crossing magnetic field lines 56 of the celestial body produces Ampere force 57 normal to the conductor and the magnetic field lines. The electric current is maintained using onboard power of facility 20. In one embodiment, solar arrays 56 provide power to facility 20. The electric current is controlled to vary Ampere force 57. In one embodiment, Ampere force 57 is used to boost the orbit of facility 20. In one embodiment, Ampere force 57 is used to perform collision avoidance maneuvers. In one embodiment, Ampere force 57 is used to move facility 20 to a different orbit. Embodiments of this propulsion system are propellantless and do not require fuel.

In one embodiment, another function of the tethered configuration is to provide low artificial gravity to assist in debris processing and manufacturing of new products. The artificial gravity conditions result from the gravity gradient and the difference between accelerations at the facility and the center of mass of the entire system. In artificial gravity, particles that may break loose during the processing will not float around indefinitely, but will soon settle on the "floor" of the compartment, where the particles can be collected. In one embodiment, another function of the tethered configuration is to provide gravity gradient stabilization in the attitude motion. One function of the gravity gradient stabilization is to facilitate interfacing with the delivery vehicles.

FIG. 3B illustrates another embodiment of in-space recycling and manufacturing facility 20. In this embodiment, the electrodynamic propulsion system of facility 20 has two electron collectors 52 and 57 and two hollow cathodes 53 and 62. Electron collector 52 is coupled to control module 61 and solar array 60 at one end of conductor 51, while electron collector 57 is coupled to control module 58 and solar array 59 at the other end of conductor 51. In this embodiment, the direction of the electric current can be reversed if needed. In one mode, electrons are collected by electron collector 52 and emitted by hollow cathode 53. In another mode, electrons are collected by electron collector 57 and emitted by hollow cathode 62. The electric current is maintained using control modules 58 and 61 and power provided by solar arrays 59 and 60.

Figure 4:
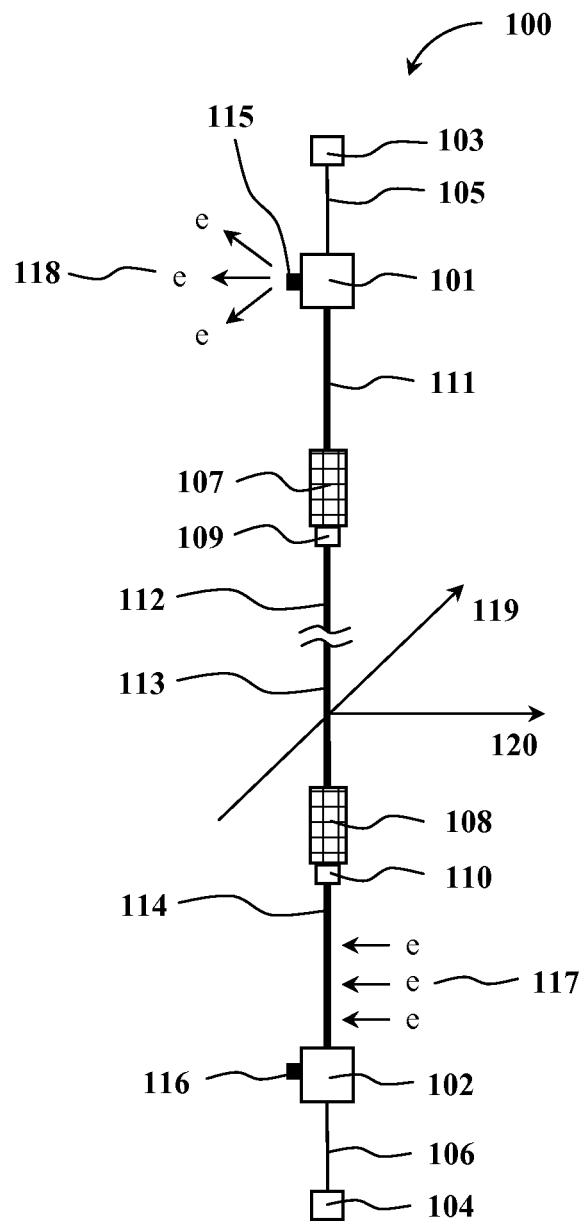
FIG. 4 is a diagram illustrating one embodiment of a space vehicle for cargo delivery using electrodynamic propulsion.

FIG. 4 illustrates one embodiment of a space vehicle 100 for cargo delivery using electrodynamic propulsion. Delivery vehicle 100 moves through the magnetic field of the celestial body surrounded by ambient plasma. Delivery vehicle 100 comprises: control module 101 with payload manager 103 attached via tether 105; control module 102 with payload manager 104 attached via tether 106; a plurality of long electrical conductors 111, 112, 113, and 114, made of reinforced bare metal tape that serve also as electron collectors; and a plurality of power modules with solar arrays 107 and 108 coupled to control modules 109 and 110 and adjacent conductor segments 111, 112, 113, and 114. In one embodiment, delivery vehicle has 10 segments, about 1 km long each, and the total mass of the vehicle is about 100 kg.

In one mode of operation, segment 114 is biased positively, attracting electrons 117 from the ambient plasma. Electrons 117 collected by segment 114 flow through segments 113, 112, and 111 to control module 101, where electrons 118 are ejected back to the ambient plasma by hollow cathode 115. The loop of electric current is closed through the ambient plasma. The resulting electric current in conducting segments crossing magnetic field lines 119 of the celestial body produces Ampere force 120 normal to the conductor and the magnetic field lines. The electric current is maintained using power from solar arrays 107 and 108.

The direction of the electric current can be reversed. In this mode, segment 111 is biased positively to collect electrons from the ambient plasma. The electrons are driven through segments 112, 113, and 114 to control module 102, where electrons are ejected back into the ambient plasma by hollow cathode 116.

The electric current is controlled in magnitude and direction to vary Ampere force 120. By varying Ampere force 120, the orbit and the attitude of delivery vehicle 100 can be changed as needed. Embodiments of this propulsion system are propellantless and do not require fuel.

In one embodiment, delivery vehicle 100 rotates about its center of mass according to U.S. Pat. No. 6,942,186, entitled "Method and Apparatus for Propulsion and Power Generation Using Spinning Electrodynamic Tethers" which is herein incorporated by reference. Rotation substantially improves stability and performance by allowing much higher electric currents in the conductor and much wider range of angles with the magnetic field of the celestial body.

In one embodiment, the delivery vehicle can change its altitude by hundreds of kilometers per day and change the orientation of its orbital plane by more than a degree per day.

In one embodiment, payload managers 103 and 104 comprise interfaces to capture and carry space debris. This configures vehicle 100 for delivery of space debris from their orbits to processing facility 20. In one embodiment, payload managers 103 and 104 comprise interfaces to acquire and carry supply packages. This configures vehicle 100 for delivery of supply packages from other orbits to processing facility 20. In one embodiment, payload managers 103 and 104 comprise interfaces to acquire and carry processed objects. This configures vehicle 100 for delivery of processed objects from facility 20 to their destination orbits.

In one embodiment, payload manager 103 comprises an interface to capture and carry space debris, while payload manager 104 comprises an interface to acquire and carry supply packages. This configures vehicle 100 for delivery of space debris from their orbits to processing facility 20 and for delivery of supply packages from other orbits to processing facility 20.

In one embodiment, payload manager 103 comprises an interface to capture and carry space debris, while payload manager 104 comprises an interface to acquire and carry processed objects. This configures vehicle 100 for delivery of space debris from their orbits to processing facility 20 and for delivery of processed objects from facility 20 to their destination orbits.

In one embodiment, payload manager 103 comprises an interface to acquire and carry supply packages, while payload manager 104 comprises an interface to acquire and carry processed objects. This configures vehicle 100 for delivery of supply packages from other orbits to processing facility 20 and for delivery of processed objects from facility 20 to their destination orbits.

In one embodiment, payload manager 103 comprises an interface to capture and carry space debris, while payload manager 104 comprises a common interface to acquire and carry supply packages and processed products. This configures vehicle 100 for delivery of space debris from their orbits to processing facility 20, for delivery of supply packages from other orbits to processing facility 20, and for delivery of processed objects from facility 20 to their destination orbits.

In one embodiment, payload managers 103 and 104 comprise common interfaces to capture and carry space debris, and to acquire and carry supply packages and processed products. This configures vehicle 100 for delivery of space debris from their orbits to processing facility 20, for delivery of supply packages from other orbits to processing facility 20, and for delivery of processed objects from facility 20 to their destination orbits.

Figure 5:
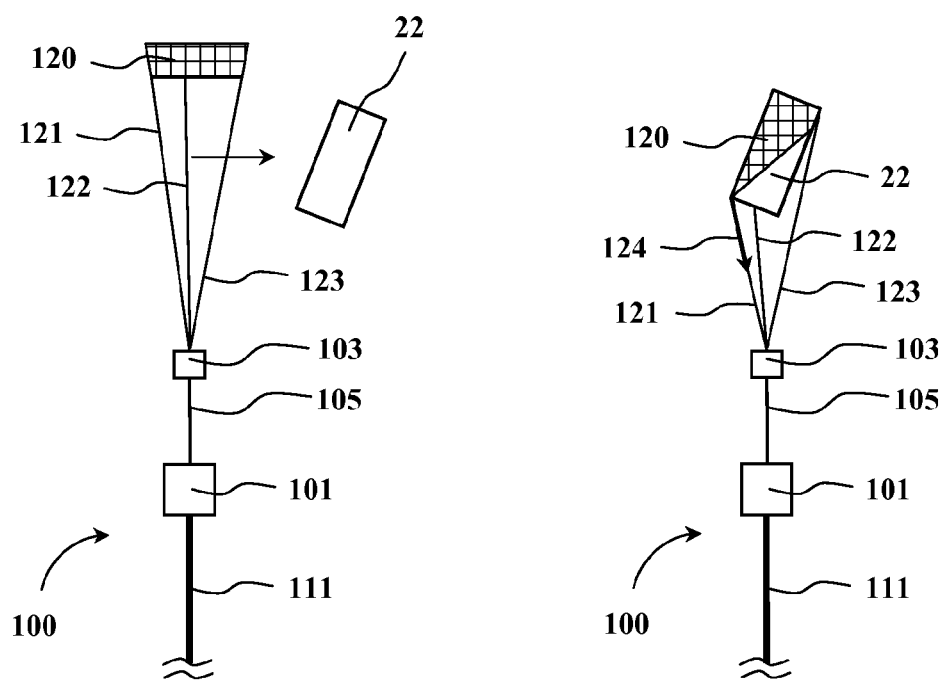
FIG. 5 is a diagram illustrating one embodiment of an interface for capturing space debris.

FIG. 5 illustrates one embodiment of an interface for capturing space debris. Only part of space delivery vehicle 100 is shown, including control module 101, conductor segment 111, and payload manager 103 connected by tether 105 to control module 101. Tether 105 is of variable length. Tether 105 can be retracted and deployed. Delivery vehicle 100 approaches space debris object 22 and adjusts its orbit and rotation to closely match the velocity of payload manager 103 with the velocity of debris object 22. The interface for capturing space debris comprises a large lightweight net. Payload manager 103 deploys net 120 on straps 121, 122, and 123, as the tip of delivery vehicle 100 slowly sweeps by debris object 22. When debris object 22 enters the area between net 120 and payload manager 103, straps 121, 122, and 123 are pulled in, and the net collapses around the debris object. Because of rotation of delivery vehicle 100 about its center of mass, centrifugal forces tighten straps 121, 122, and 123, and strap tension 124 quickly de-tumbles and stabilizes debris object 22 in the net, where debris object 22 remains secured during the delivery trip.

One function of payload manager 103 is to carry, deploy, and control the nets for debris capture. Another function is to maneuver to an optimal relative position for debris capture. Another function is to keep the core propulsive components of delivery vehicle 100 at a safe distance from debris object 22. Another function is to be able to abort capture by pulling back if the approach was not successful. Being propellantless, delivery vehicle 100 has an advantage of repeating capture approaches as many times as necessary until debris object 22 is captured and secured.

In one embodiment, the nets for capturing large debris objects are house-sized and only about 50 g each.

Figure 6:
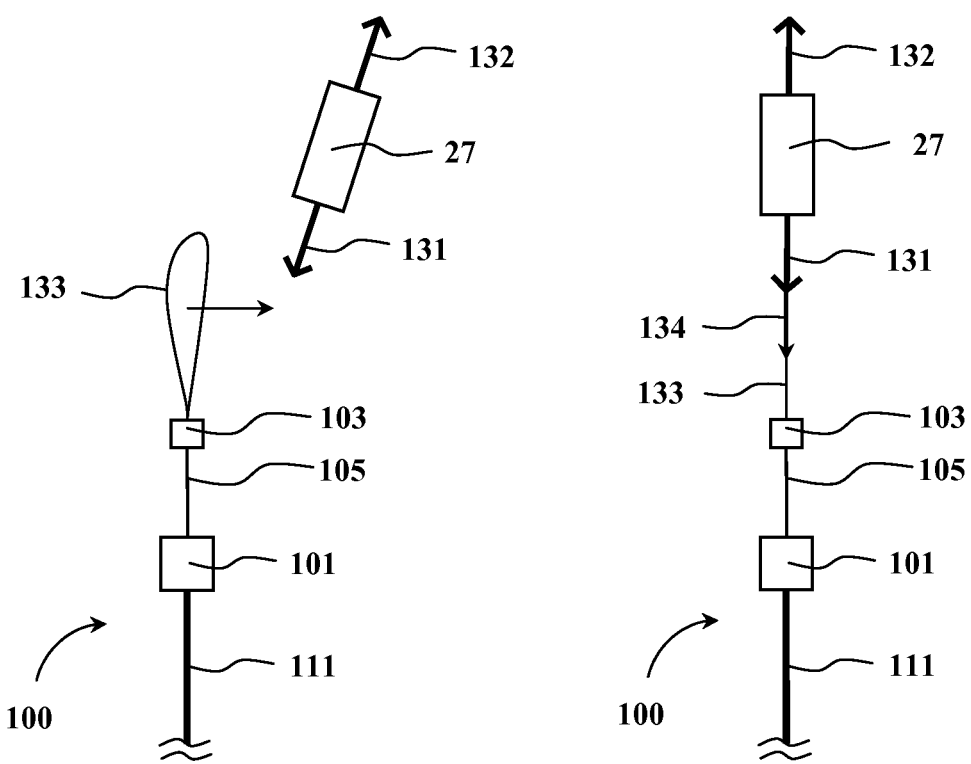
FIG. 6 is a diagram illustrating one embodiment of an interface for acquiring supply packages.

FIG. 6 illustrates one embodiment of an interface for acquiring supply packages. Only part of space delivery vehicle 100 is shown, including control module 101, conductor segment 111, and payload manager 103 connected by tether 105 to control module 101. Tether 105 is of variable length. Tether 105 can be retracted and deployed. Delivery vehicle 100 approaches supply package 27 and adjusts its orbit and rotation to closely match the velocity of payload manager 103 with the velocity of supply package 27. Supply package 27 deploys capture hooks 131 and 132. One hook can be used for capture by delivery vehicle 100, the other can be used for capture by the processing facility. The interface for capturing supply packages comprises a tether loop. Payload manager 103 deploys tether loop 133, as the tip of delivery vehicle 100 slowly sweeps by supply package 27. When tether loop 133 reaches capture hook 131 of supply package 27, payload manager 103 pulls the loop to tighten it on the capture hook. Because of rotation of delivery vehicle 100 about its center of mass, centrifugal forces tighten tether loop 133, and tether tension 134 quickly stabilizes supply package 27 and keeps it secured during the delivery trip.

One function of payload manager 103 is to carry, deploy, and control the tether loops for supply package acquisition. Another function is to maneuver to an optimal relative position for the acquisition. Another function is to keep the core propulsive components of delivery vehicle 100 at a safe distance from supply package 27. Another function is to be able to abort acquisition attempt by pulling back if the approach was not successful. Being propellantless, delivery vehicle 100 has an advantage of repeating acquisition approaches as many times as necessary until supply package 27 is secured.

Figure 7:
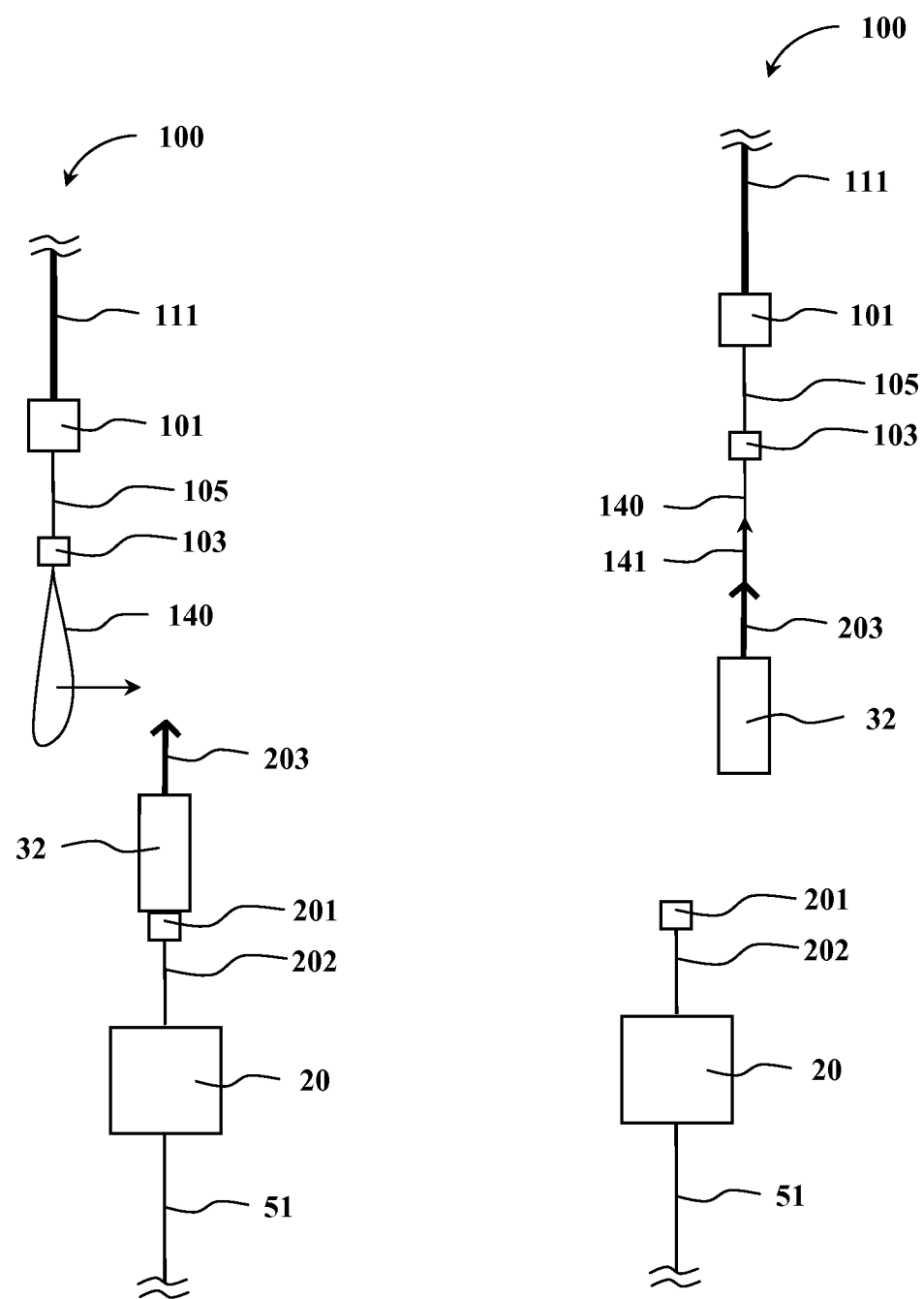
FIG. 7 is a diagram illustrating one embodiment of an interface for acquiring processed objects.

FIG. 7 illustrates one embodiment of an interface for acquiring processed objects. Only part of space delivery vehicle 100 is shown, including control module 101, conductor segment 111, and payload manager 103 connected by tether 105 to control module 101. Tether 105 is of variable length. Tether 105 can be retracted and deployed. In this embodiment, processing facility 20 is connected through electrodynamic tether 51 to a counterweight (not shown), as illustrated in FIGS. 3A and 3B and described above. Processed object 32 is deployed from facility 20 on payload manager 201 attached to tether 202.

Delivery vehicle 100 approaches processed object 32 and adjusts its orbit and rotation to closely match the velocity of payload manager 103 with the velocity of processed object 32. Processed object 32 deploys capture hook 203. The interface for capturing processed objects comprises a tether loop. Payload manager 103 deploys tether loop 140, as the tip of delivery vehicle 100 slowly sweeps by processed object 32. When tether loop 140 reaches capture hook 203 of processed object 32, payload manager 103 pulls the loop to tighten it on the capture hook. At the same time, payload manager 201 releases processed object 32. Because of rotation of delivery vehicle 100 about its center of mass, centrifugal forces tighten tether loop 140, and tether tension 141 quickly stabilizes processed object 32 and keeps it secured during the delivery trip.

One function of payload manager 103 is to carry, deploy, and control the tether loops for processed object acquisition. Another function is to maneuver to an optimal relative position for the acquisition. Another function is to keep the core propulsive components of delivery vehicle 100 at a safe distance from processed object 32. Another function is to be able to abort acquisition attempt by pulling back if the approach was not successful. Being propellantless, delivery vehicle 100 has an advantage of repeating acquisition approaches as many times as necessary until processed object 32 is secured.

Figure 8:
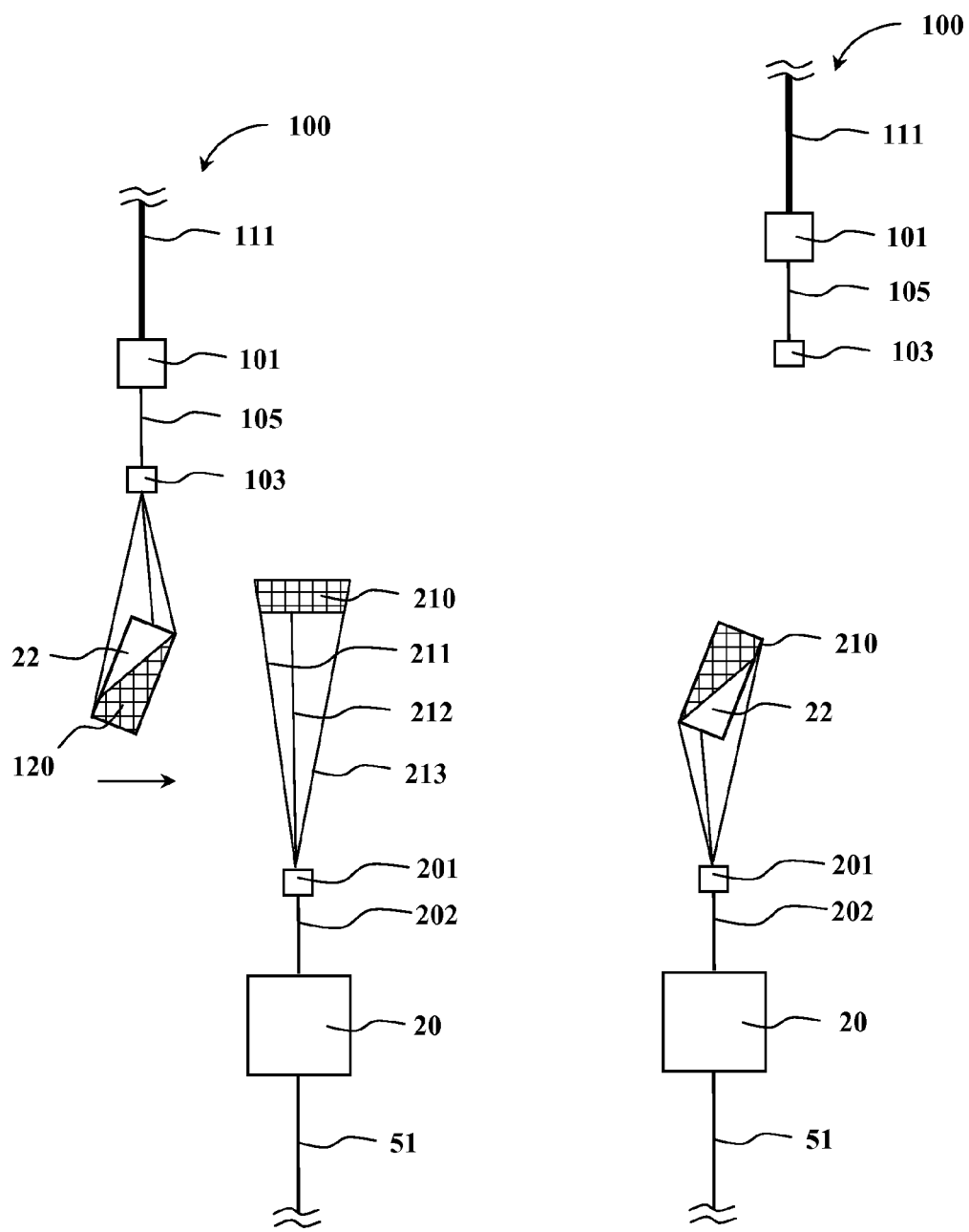
FIG. 8 is a diagram illustrating one embodiment of an interface for handing debris objects over to the processing facility.

FIG. 8 illustrates one embodiment of an interface for handing debris objects over to the processing facility. Only part of space delivery vehicle 100 is shown, including control module 101, conductor segment 111, and payload manager 103 connected by tether 105 to control module 101. Tether 105 is of variable length. Tether 105 can be retracted and deployed. Debris object 22 is secured in net 120 deployed from payload manager 103.

In this embodiment, processing facility 20 is connected through electrodynamic tether 51 to a counterweight (not shown), as illustrated in FIGS. 3A and 3B and described above. The interface for capturing space debris comprises a net. Payload manager 201 deploys net 210 on straps 211, 212, and 213. Delivery vehicle 100 approaches processing facility 20 and adjusts its orbit and rotation to closely match the velocity of payload manager 103 with the velocity of payload manager 201. The tip of delivery vehicle 100 slowly moves toward net 210. As debris object 22 comes close to net 210 deployed from the facility, payload manager 103 of the delivery vehicle releases the straps on net 120 holding the debris objects. When debris object 22 enters the area between net 210 and payload manager 201, straps 211, 212, and 213 are pulled in, and the net collapses around the debris object. Gravity gradient forces tighten straps 211, 212, and 213, and payload manager 201 damps residual oscillations, stabilizes debris object 22 in the net, and retrieves debris object 22 inside facility 20. If approach was unsuccessful, handover is aborted. Being propellantless, delivery vehicle 100 can repeat approaches as many times as necessary until debris object 22 is safely handed over to facility 20.

Figure 9:
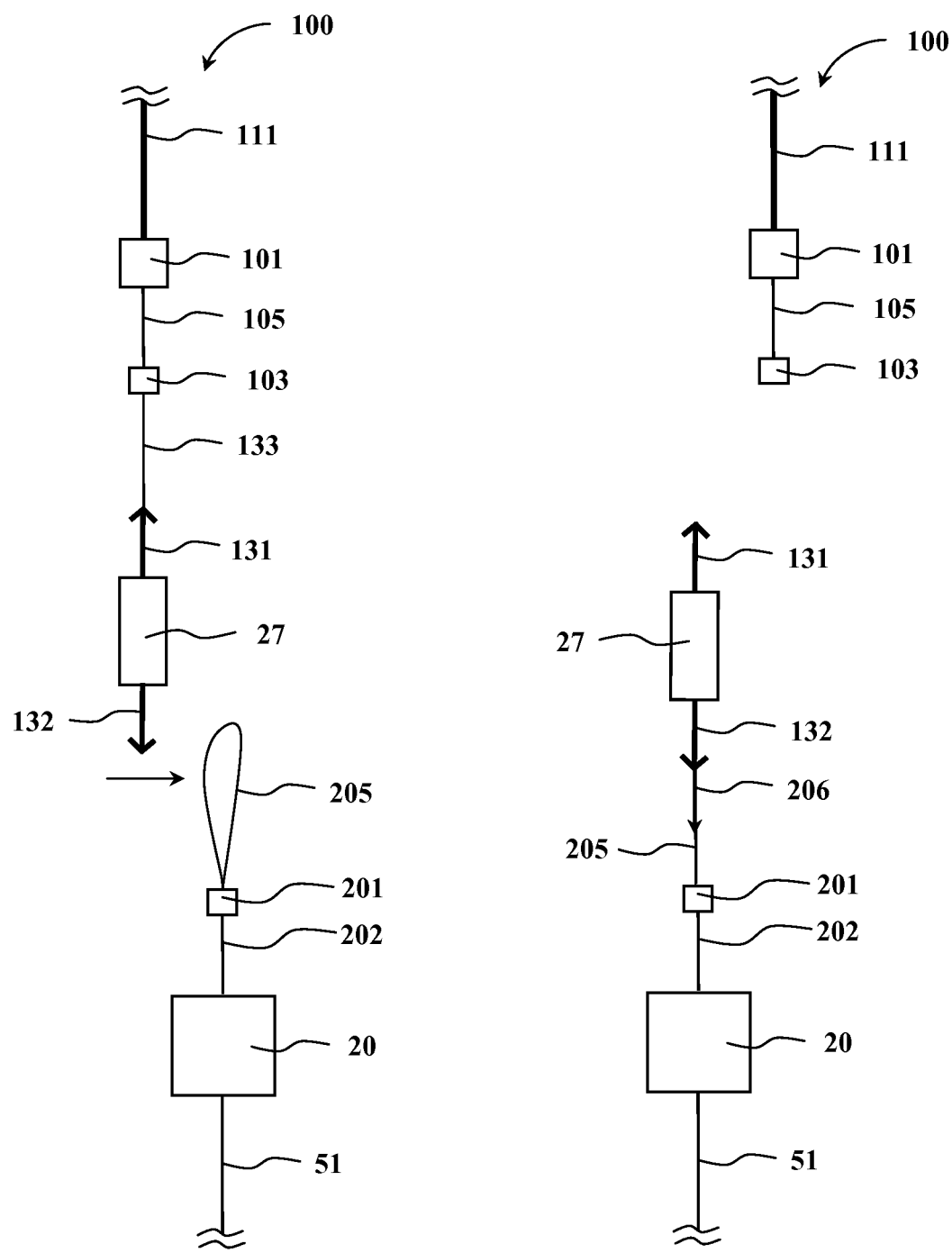
FIG. 9 is a diagram illustrating one embodiment of an interface for handing supply packages over to the processing facility.

FIG. 9 illustrates one embodiment of an interface for handing supply packages over to the processing facility. Only part of space delivery vehicle 100 is shown, including control module 101, conductor segment 111, and payload manager 103 connected by tether 105 to control module 101. Tether 105 is of variable length. Tether 105 can be retracted and deployed. Supply package 27 is secured by tether loop 133 tightened on capture hook 131 of the supply package.

In this embodiment, processing facility 20 is connected through electrodynamic tether 51 to a counterweight (not shown), as illustrated in FIGS. 3A and 3B and described above. The interface for capturing supply packages comprises a tether loop. Payload manager 201 deploys tether loop 205. Delivery vehicle 100 approaches facility 20 and adjusts its orbit and rotation to closely match the velocity of payload manager 103 with the velocity of payload manager 201. The tip of delivery vehicle 100 slowly moves toward loop 205. As supply package 27 comes close to the loop deployed from the facility, payload manager 103 of the delivery vehicle release tether loop 133 holding the supply package. When tether loop 205 reaches capture hook 132 of supply package 27, payload manager 201 pulls the loop to tighten it on the capture hook. Gravity gradient forces tighten tether loop 205, and payload manager 201 damps residual oscillations, stabilizes supply package 27 on the tether, and retrieves supply package 27 inside facility 20. If approach was unsuccessful, handover is aborted. Being propellantless, delivery vehicle 100 can repeat approaches as many times as necessary until supply package 27 is safely handed over to facility 20.

Figure 10:
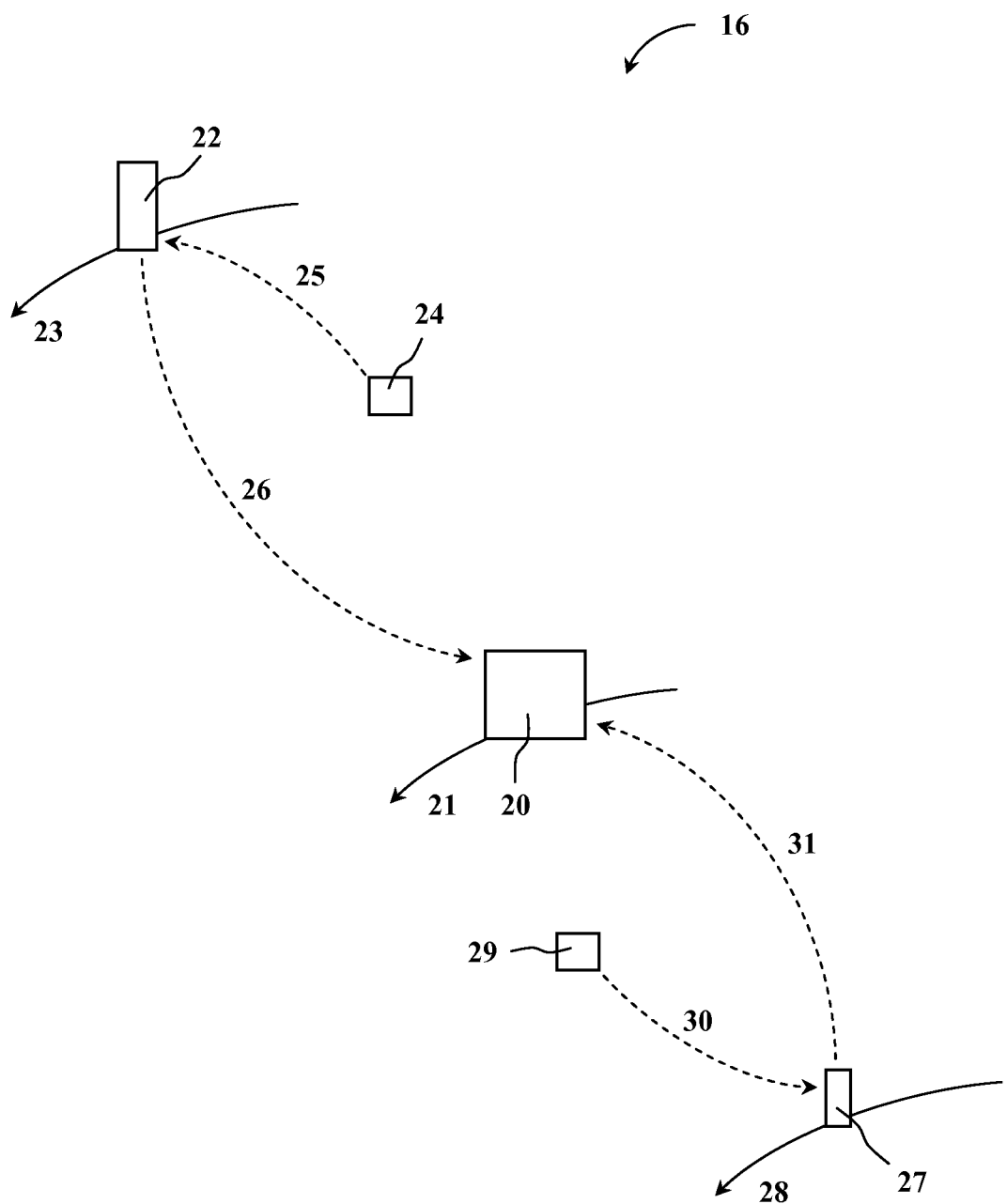
FIG. 10 is a diagram illustrating one embodiment of a space processing and delivery system.

FIG. 10 illustrates one embodiment of a space processing and delivery system 16. A facility 20 is in orbit 21 around a celestial body having a magnetic field. Facility 20 holds supplies and is configured to process space debris, recover materials and parts from the debris, and manufacture products utilizing these materials, parts, and supplies. Facility 20 is also configured to interface with space delivery vehicles.

Space debris object 22 is in orbit 23 around the same celestial body. Common debris objects are upper stages, satellites not in use, tracked debris object fragments, and untracked debris object fragments. Satellites not in use include non-functioning satellites, partially functioning satellites, and fully functioning satellites that are not being operated. Space vehicle 24 is configured to deliver space debris objects to processing facility 20 using electrodynamic propulsion. Space vehicle 24 approaches space debris object 22 along path 25, captures space debris object 22, and delivers space debris object 22 to facility 20 along path 26, where space vehicle 24 releases space debris object 22 and hands it over to facility 20 for storage and processing.

Supply package 27 is made available for pick-up in orbit 28. In some embodiments, it is delivered as a secondary payload from the ground and left in orbit allowable by the primary launch objective. In other embodiments, it is produced by another orbital manufacturing facility and left in orbit allowable by the delivery system of that facility. In some embodiments, the supply package contains at least one of structural elements, parts of a control system, manufacturing tools, manufacturing materials, replacement parts, and new modules to be integrated with the processing facility. Space vehicle 29 is configured to deliver supply packages to processing facility 20 using electrodynamic propulsion. Space vehicle 29 approaches supply package 27 along path 30, captures supply package 27, and delivers it to facility 20 along path 31, where space vehicle 29 hands supply package 27 over to facility 20 for storage and utilization.

Facility 20 recovers materials and parts from space debris. In one embodiment, some parts of space debris objects are cut into pieces. In one embodiment, these pieces are substantially rectangular of similar sizes. In one embodiment, some of these pieces are used for further processing. In one embodiment, some parts of space debris objects are processed into metal powder. In one embodiment, some of this metal powder is used for further processing. In one embodiment, some parts of space debris objects are melted. In one embodiment, some parts of the new objects are produced by vapor deposit. In one embodiment, some parts of the new objects are produced by molten spray. In one embodiment, some parts of the new objects are produced by 3D printing. In one embodiment, some parts of space debris objects are reconditioned for reuse.

In one embodiment, a delivery vehicle is used to dispose some parts of the debris objects that cannot be processed at facility 20. In one embodiment, the disposal method is to bring a package with these parts to a low orbit for atmospheric reentry.

In one embodiment, facility 20 is robotic. In one embodiment, facility 20 is remotely controlled. In one embodiment, facility 20 provides supplies to delivery vehicles 24 and 29. In one embodiment, these supplies comprise replacement parts.

Facility 20 uses supplies and materials and parts recovered from space debris to make new objects that are used to expand facility 20. In one embodiment, facility 20 produces construction elements that are used to build new modules of facility 20. In one embodiment, facility 20 produces shielding against radiation and impact of small objects that is used to protect facility 20. Embodiments of this method allow construction of large facilities that cannot be launched from the ground even with heavy-lift vehicles.

In one embodiment, facility 20 uses electrodynamic propulsion, as illustrated in FIGS. 3A and 3B and described above. Embodiments of this facility 20 propulsion system are propellantless and do not require fuel supplies. In one embodiment, electrodynamic propulsion is used to boost the orbit of facility 20. In one embodiment, electrodynamic propulsion is used to perform collision avoidance maneuvers. In one embodiment, electrodynamic propulsion is used to move facility 20 to a different orbit.

In one embodiment, facility 20 is placed in a debris cluster for more efficient debris collection. Multiple clusters of debris objects exist, both in terms of inclination and altitude. Once the facility is built, it can be moved to another orbit using electrodynamic propulsion.

In one embodiment, facility 20 is built to host at least one of manufacturing unit, assembly unit, storage unit, service unit, fuel depot, space habitat, space station, and space hotel. In one embodiment, facility 20 is built until it reaches a desired size, after which time it starts making products for other customers and delivering these products to other orbits, as illustrated in FIG. 1 and described above.

Figure 11:
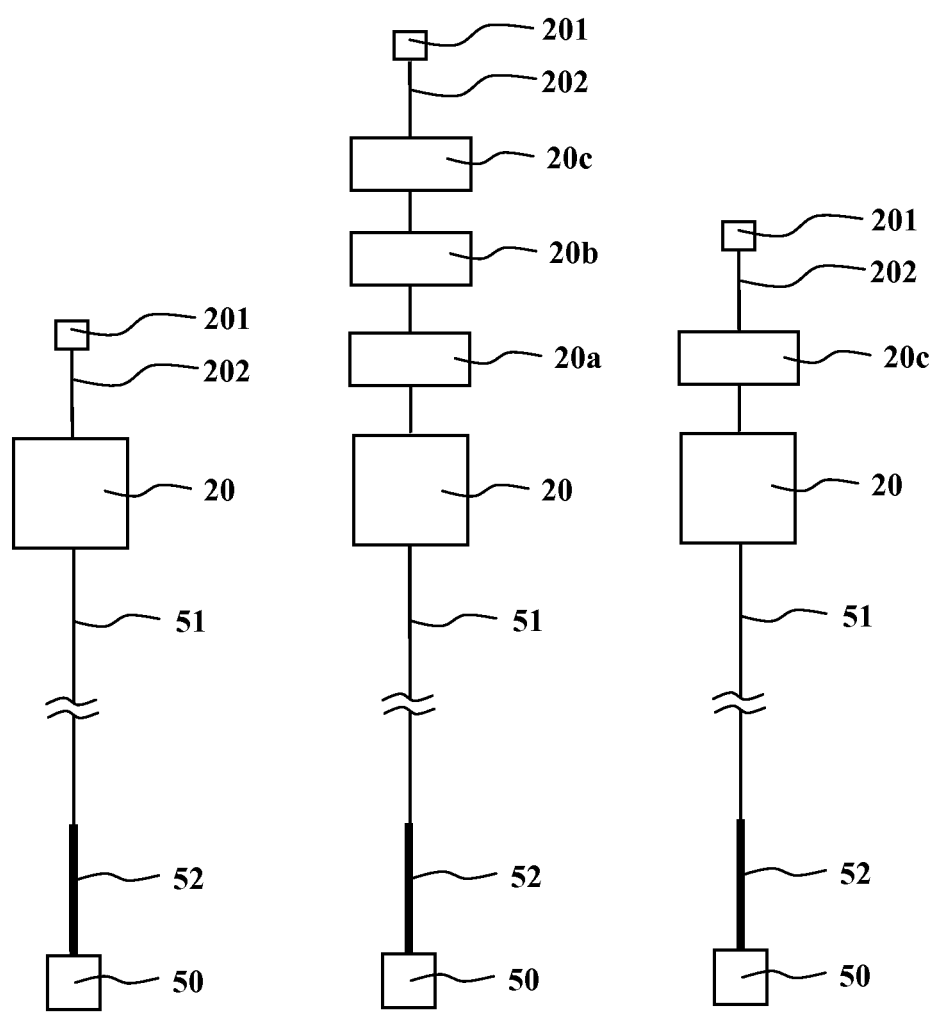
FIG. 11 is a diagram illustrating one embodiment of debris storage at a space processing facility.

FIG. 11 illustrates one embodiment of debris storage at the space processing facility. In this embodiment, facility 20 uses electrodynamic propulsion, as illustrated in FIGS. 3A and 3B and described above. Facility 20 is tethered to counterweight 50 through conductor 51 and electron collector 52. The entire configuration is stabilized vertically by the gravity gradient. Payload manager 201 is deployed from facility 20 on tether 202. Tether 202 is of variable length. Tether 202 can be retracted and deployed. Space debris objects are delivered to facility 20 by a delivery vehicle (not shown). Space debris objects are captured by payload manager and stored for future processing. Storage is achieved by attaching to tether 202. First object 20a is attached closest to facility 20. Some extra length of tether 202 is deployed by payload manager 201. Second object 20b is attached at a safe distance next to object 20a. More length of tether 202 is deployed by payload manager 201. Third object 20c is attached at a safe distance next to object 20b. Electrodynamic propulsion allows reboost and collision avoidance for the facility and the entire collection of stored debris objects. When processing starts, object 20a closest to facility 20 is retrieved and processed. It is followed by object 20b and then by object 20c. This storage capability allows flexible, asynchronous scheduling of debris delivery and debris processing.

Figure 12:
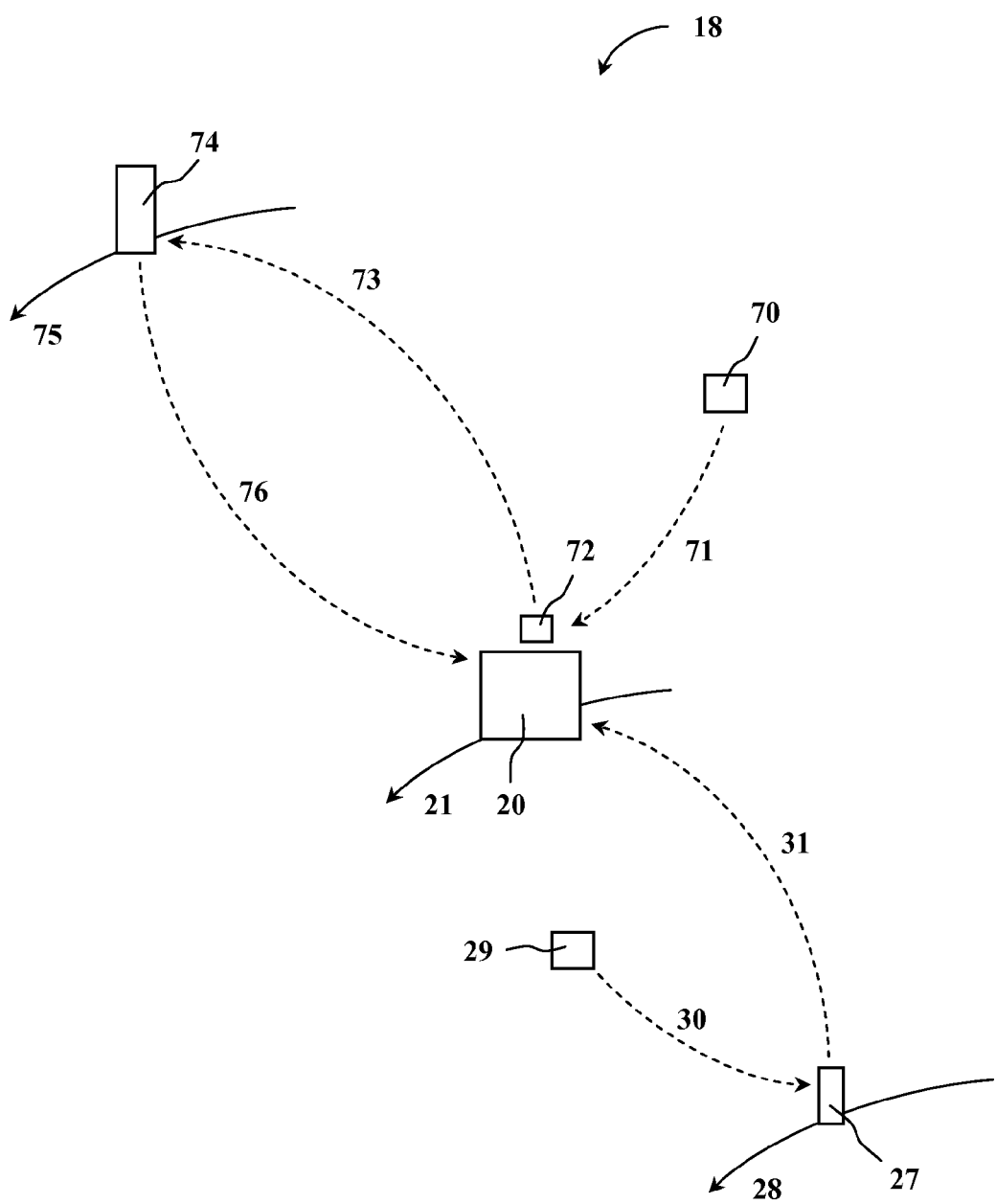
FIG. 12 is a diagram illustrating one embodiment of a space processing and delivery system.

FIG. 12 illustrates one embodiment of a space processing and delivery system 18. A facility 20 is in orbit 21 around a celestial body having a magnetic field. Facility 20 holds supplies and is configured to provide service and deliver supplies to space vehicles. Facility 20 is also configured to interface with space delivery vehicles. Service module 72 is configured to service space vehicles and deliver supplies from facility 20. Space vehicle 74 is in orbit 75 around the same celestial body and is in need of service or supplies. In one embodiment, service comprises refueling. In one embodiment, service comprises replacing parts. In one embodiment, service comprises integrating new modules. Space vehicle 70 is configured to deliver service modules using electrodynamic propulsion. Space vehicle 70 approaches facility 20 along path 71, acquires service module 72 from the facility, approaches space vehicle 74 along path 73, closely matches its orbit 75, and releases service module 72 in the vicinity of space vehicle 74. Service module 72 approaches space vehicle 74 and performs the required service. Once space vehicle 74 is serviced, service module 72 moves away to a safe distance for pick-up. Delivery vehicle 70 approaches service module 72, acquires it, and delivers it back to facility 20 along path 76, where service module 72 is handed over to facility 20. In one embodiment, the acquisition and handover are performed using loop-and-hook interfaces, such as illustrated in FIGS. 6, 7, and 9 and described above.

Supply package 27 is made available for pick-up in orbit 28. In some embodiments, supply package 27 is delivered as a secondary payload from the ground and left in orbit allowable by the primary launch objective. In other embodiments, supply package 27 is produced by another orbital manufacturing facility and left in orbit allowable by the delivery system of that facility. In some embodiments, the supply package 27 contains at least one of fuel, replacement parts, and new modules to be integrated with space vehicles. Space vehicle 29 is configured to deliver supply packages to processing facility 20 using electrodynamic propulsion. Space vehicle 29 approaches supply package 27 along path 30, captures supply package 27, and delivers it to facility 20 along path 31, where supply package 27 is handed over to facility 20 for storage and utilization. In one embodiment, the capture and handover are performed using loop-and-hook interfaces, such as illustrated in FIGS. 6, 7, and 9 and described above.

In one embodiment, facility 20 is robotic. In one embodiment, facility 20 is remotely controlled. In one embodiment, facility 20 provides supplies to delivery vehicle 70. In one embodiment, these supplies comprise replacement parts.

In one embodiment, facility 20 uses electrodynamic propulsion, as illustrated in FIGS. 3A and 3B and described above. Embodiments of this facility 20 propulsion system are propellantless and do not require fuel supplies. In one embodiment, electrodynamic propulsion is used to boost the orbit of facility 20. In one embodiment, electrodynamic propulsion is used to perform collision avoidance maneuvers. In one embodiment, electrodynamic propulsion is used to move facility 20 to a different orbit.

In one embodiment, facility 20 is placed in a satellite cluster for more efficient service to a particular group of satellites.

In one embodiment, service module 72 is used to service delivery vehicle 70. In this embodiment, delivery vehicle 70 approaches facility 20 along path 71, acquires service module 72 from the facility, and service module 72 performs its service. Once vehicle 70 is serviced, vehicle 70 returns service module 72 and hands service module 72 over to facility 20.

In one embodiment, delivery vehicles are used to deliver satellites for service to facility 20 and return them back to operational orbits after service.

In one embodiment, facility 20 is also used for debris recycling. In one embodiment, facility 20 is also used for manufacturing. In one embodiment, facility 20 uses materials and parts recovered from debris recycling to expand itself.

In-space processing and delivery system embodiments described herein can be comprehensive. In-space processing and delivery embodiments can support substantially all operations employed for debris recycling, in-space manufacturing, and in-space servicing utilizing commonality of functions and elements and unified architecture.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A processing and delivery system in space around a celestial body having a magnetic field comprising:
   at least one facility in a first orbit in space around the celestial body, the at least one facility to:
     hold supplies;
     recycle space debris objects;
     recover materials and parts from the space debris objects; and
     manufacture new products utilizing the supplies and the recovered materials and parts, wherein the manufacture comprises at least one of:
       cut some parts of the space debris objects into pieces;
       process some parts of the space debris objects into powder; and
       melt some parts of the space debris objects;
   a group including one or more space vehicles, wherein:
     at least one of the group of space vehicles includes an electrodynamic propulsion device to deliver the space debris objects from their orbits to the at least one facility in the first orbit primarily utilizing electrodynamic propulsion;
     at least one of the group of space vehicles includes an electrodynamic propulsion device to deliver new supplies to the at least one facility in the first orbit from other orbits primarily utilizing electrodynamic propulsion; and
     at least one of the group of space vehicles includes an electrodynamic propulsion device to deliver the new products from the at least one facility in the first orbit to their destination orbits primarily utilizing electrodynamic propulsion.

2. The system of claim 1, wherein the facility includes an electrodynamic propulsion device to maneuver the facility primarily utilizing electrodynamic propulsion.

3. The system of claim 1, wherein the facility is robotic.

4. The system of claim 1, wherein the facility is remotely controlled.

5. The system of claim 1, wherein some of space debris objects are stored for later processing.

6. The system of claim 1, wherein space debris objects are placed into enclosure for processing.

7. The system of claim 6, wherein the enclosure is inflatable.

8. The system of claim 1, wherein some parts of space debris objects are cut into pieces.

9. The system of claim 8, wherein some of the pieces are substantially rectangular of similar sizes.

10. The system of claim 8, wherein some of the pieces are used for further processing.

11. The system of claim 1, wherein some parts of space debris objects are processed into metal powder.

12. The system of claim 11, wherein some amount of the metal powder is used for further processing.

13. The system of claim 1, wherein some parts of space debris objects are melted.

14. The system of claim 1, wherein at least some parts of the new objects are produced by at least one of vapor deposit, molten spray, and 3D printing.

15. The system of claim 1, wherein at least some of the processed objects are construction elements.

16. The system of claim 1, wherein at least some of the processed objects are used for shielding against radiation and impact of small objects.

17. The system of claim 1, wherein at least some parts of space debris objects are reconditioned for reuse.

18. The system of claim 1, wherein some of the space debris objects include parts and some of the parts are stored for later processing.

19. The system of claim 1, wherein some parts of space debris objects are disposed of.

20. The system of claim 1, wherein at least some of the processing facilities are placed in debris clusters.

21. The system of claim 1, wherein recovered materials are used to expand the facility.

22. The system of claim 1, wherein the delivery vehicles are re-supplied from the facility.

23. The system of claim 1, wherein the facility uses tethered counterweight to create artificial gravity.

24. The system of claim 1, wherein the supplies comprise at least one of structural elements, parts of control system, manufacturing tools, manufacturing materials, replacement parts, and new modules to be integrated with the facility.

25. A processing and delivery system in space around a celestial body having a magnetic field comprising:
   at least one facility in a first orbit in space around the celestial body, the at least one facility to:
     hold supplies;
     recycle space debris objects;
     recover materials and parts from the space debris objects;
     manufacture new products utilizing the supplies and the recovered materials and parts, wherein the manufacture comprises at least one of:
       cut some parts of the space debris objects into pieces;
       process some parts of the space debris objects into powder; and
       melt some parts of the space debris objects; and
     employ the new products to expand the at least one facility;
   a group including one or more space vehicles, wherein:
     at least one of the group of space vehicles includes an electrodynamic propulsion device to deliver the space debris objects from their orbits to the at least one facility in the first orbit primarily utilizing electrodynamic propulsion; and
     at least one of the group of space vehicles includes an electrodynamic propulsion device to deliver new supplies to the at least one facility in the first orbit from other orbits primarily utilizing electrodynamic propulsion.

26. The system of claim 25, wherein the facility includes an electrodynamic propulsion device to maneuver the facility primarily utilizing electrodynamic propulsion.

27. The system of claim 25, wherein the facility is robotic.

28. The system of claim 25, wherein the facility is remotely controlled.

29. The system of claim 25, wherein some of space debris objects are stored for later processing.

30. The system of claim 25, wherein space debris objects are placed into enclosure for processing.

31. The system of claim 30, wherein the enclosure is inflatable.

32. The system of claim 25, wherein some parts of space debris objects are cut into pieces.

33. The system of claim 25, wherein some of the pieces are substantially rectangular of similar sizes.

34. The system of claim 25, wherein some of the pieces are used for further processing.

35. The system of claim 25, wherein some parts of space debris objects are processed into metal powder.

36. The system of claim 35, wherein some amount of the metal powder is used for further processing.

37. The system of claim 25, wherein some parts of space debris objects are melted.

38. The system of claim 25, wherein at least some parts of the new objects are produced by at least one of vapor deposit, molten spray, and 3D printing.

39. The system of claim 25, wherein at least some of the processed objects are construction elements.

40. The system of claim 25, wherein at least some of the processed objects are used for shielding against radiation and impact of small objects.

41. The system of claim 25, wherein at least some parts of space debris objects are reconditioned for reuse.

42. The system of claim 25, wherein some of space debris objects include parts and some of the parts are stored for later processing.

43. The system of claim 25, wherein some parts of space debris objects are disposed of.

44. The system of claim 25, wherein at least some of the processing facilities are placed in debris clusters.

45. The system of claim 25, wherein the delivery vehicles are re-supplied from the facility.

46. The system of claim 25, wherein the facility uses tethered counterweight to create artificial gravity.

47. The system of claim 25, wherein the supplies comprise at least one of structural elements, parts of control system, manufacturing tools, manufacturing materials, replacement parts, and new modules to be integrated with the facility.

48. A processing and delivery system in space around a celestial body having a magnetic field comprising:
    at least one facility in a first orbit in space around the celestial body, the at least one facility to:
        provide service to space vehicles;
        hold supplies;
        recycle space debris objects;
        recover materials and parts from the space debris objects; and
        manufacture new products utilizing the supplies and the recovered materials and parts, wherein the manufacture comprises at least one of:
            cut some parts of the space debris objects into pieces;
            process some parts of the space debris objects into powder; and
            melt some parts of the space debris objects;
    at least one service module to service space vehicles;
    a group including one or more space vehicles, wherein:
        at least one of the group of space vehicles includes an electrodynamic propulsion device to deliver the service module from the facility in the first orbit to space objects in their orbits primarily utilizing electrodynamic propulsion and return the service module back to the facility in the first orbit primarily utilizing electrodynamic propulsion; and
        at least one of the group of space vehicles includes an electrodynamic propulsion device to deliver the space debris objects from their orbits to the at least one facility in the first orbit primarily utilizing electrodynamic propulsion;
        at least one of the group of space vehicles includes an electrodynamic propulsion device to deliver new supplies to the facility in the first orbit from other orbits primarily utilizing electrodynamic propulsion.

49. The system of claim 48, wherein the facility includes an electrodynamic propulsion device to maneuver the facility primarily utilizing electrodynamic propulsion.

50. The system of claim 48, wherein the facility is robotic.

51. The system of claim 48, wherein the facility is remotely controlled.

52. The system of claim 48, wherein the service modules deliver at least one of fuel, replacement parts, and new modules to be integrated with space objects.

53. The system of claim 48, wherein the service is provided to the delivery vehicles.

54. The system of claim 48, wherein the supplies comprise at least one of fuel, replacement parts, and new modules to be integrated with space vehicles.

55. The system of claim 48, wherein at least some of the processing facilities are placed in satellite clusters.

* * * * *